Oct. 27, 1959 G. D. CONLEE 2,910,161
DRIVE MECHANISM FOR WASHING MACHINES
Filed Sept. 30, 1957 4 Sheets-Sheet 1

INVENTOR
George D. Conlee
By Carlson, Pitzner, Hubbard & Wolfe
ATTORNEYS

Oct. 27, 1959 G. D. CONLEE 2,910,161
DRIVE MECHANISM FOR WASHING MACHINES
Filed Sept. 30, 1957 4 Sheets-Sheet 2
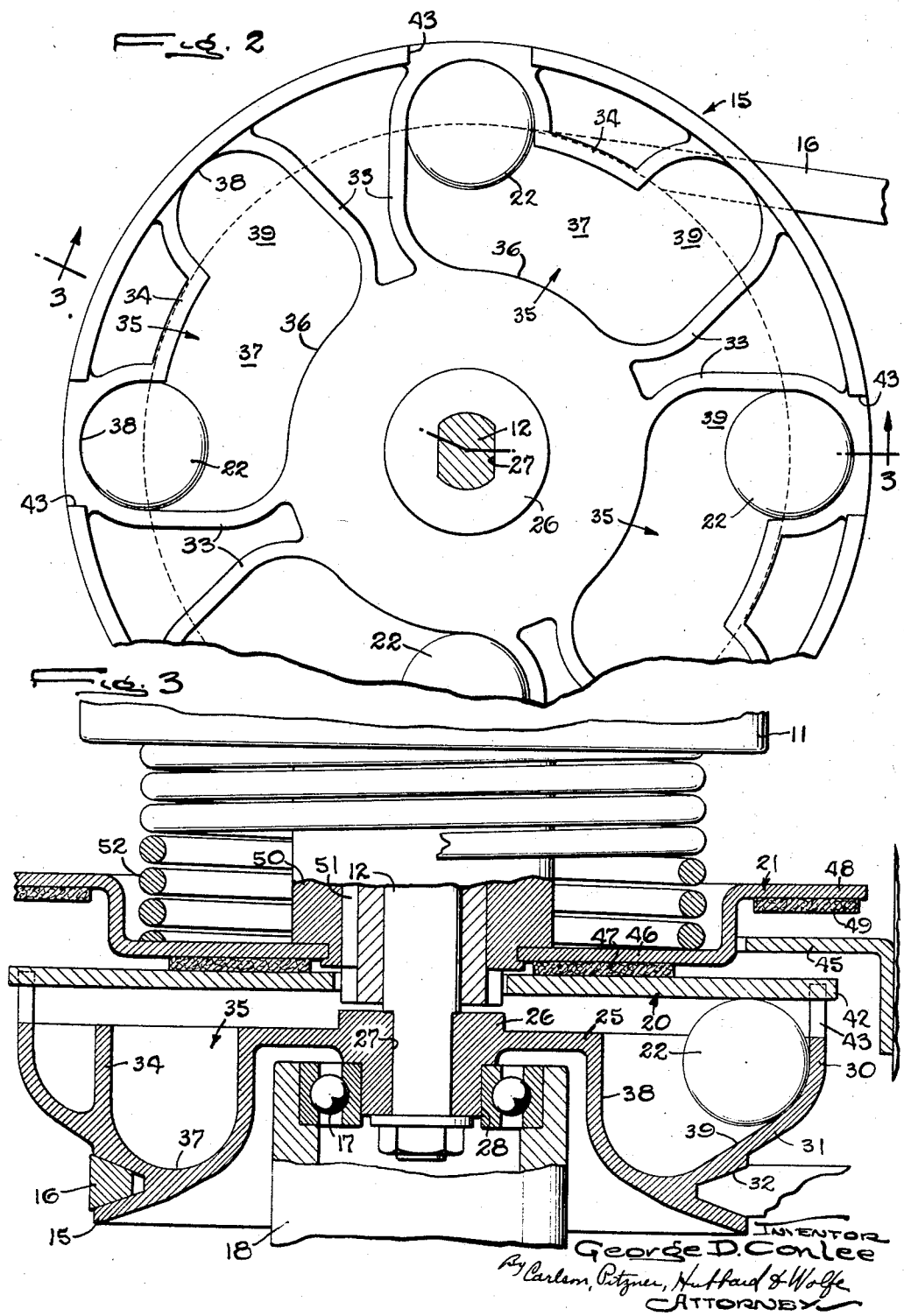
INVENTOR
George D. Conlee
By Carlson, Pitzner, Hubbard & Wolfe
ATTORNEY Oct. 27, 1959 G. D. CONLEE 2,910,161
DRIVE MECHANISM FOR WASHING MACHINES
Filed Sept. 30, 1957 4 Sheets-Sheet 3
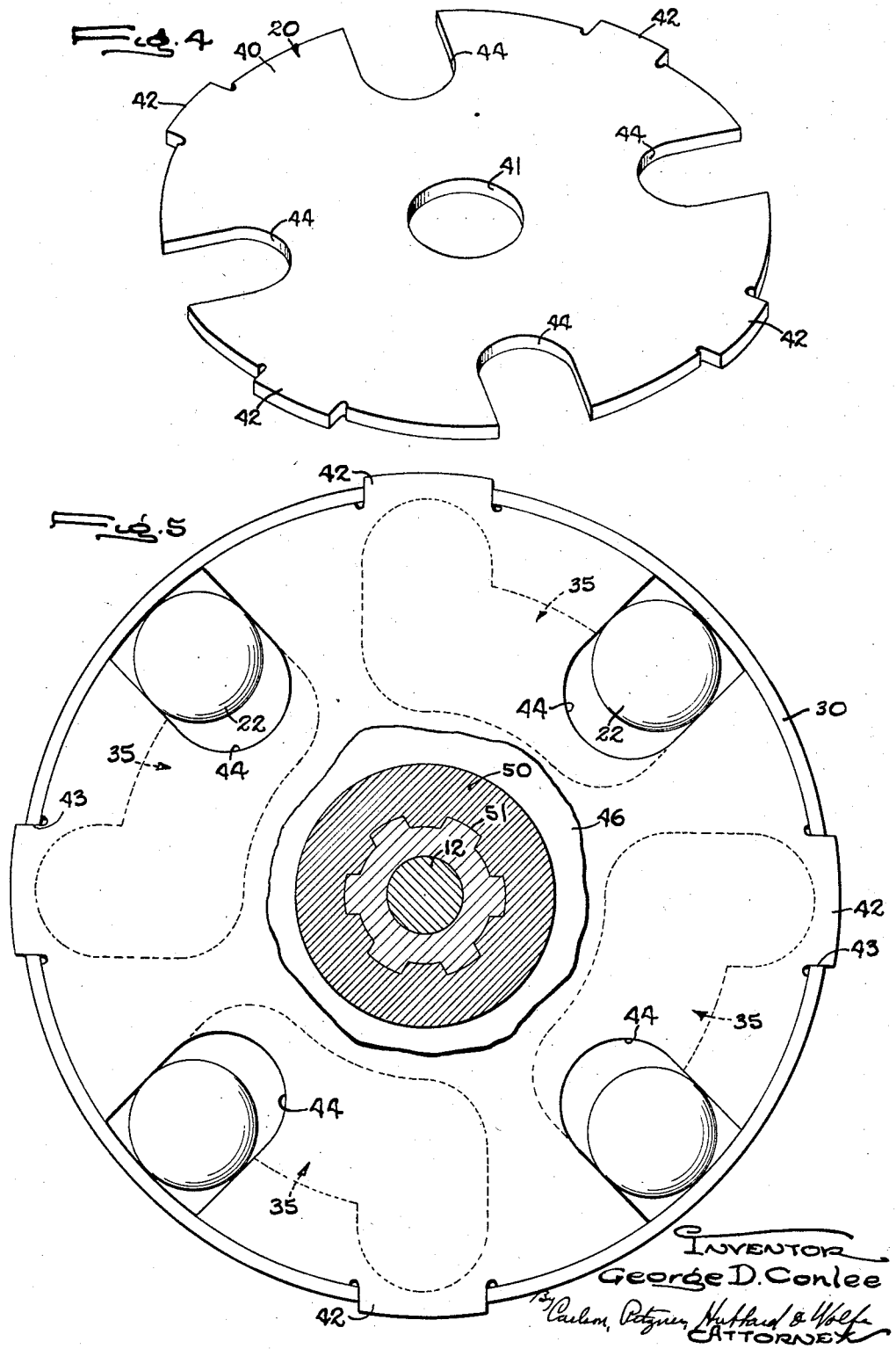
INVENTOR
George D. Conlee Oct. 27, 1959
G. D. CONLEE
2,910,161
DRIVE MECHANISM FOR WASHING MACHINES
Filed Sept. 30, 1957
4 Sheets-Sheet 4
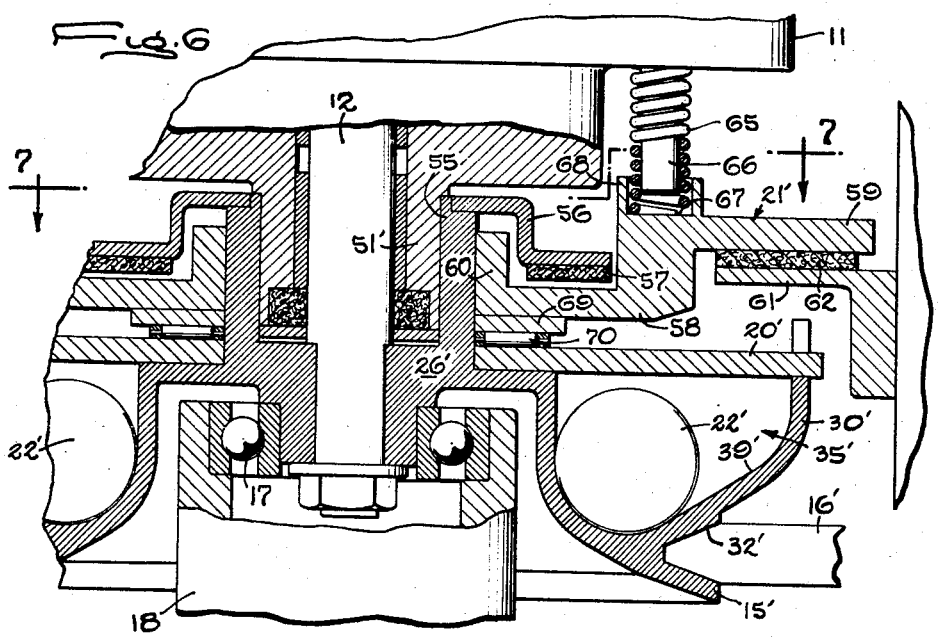
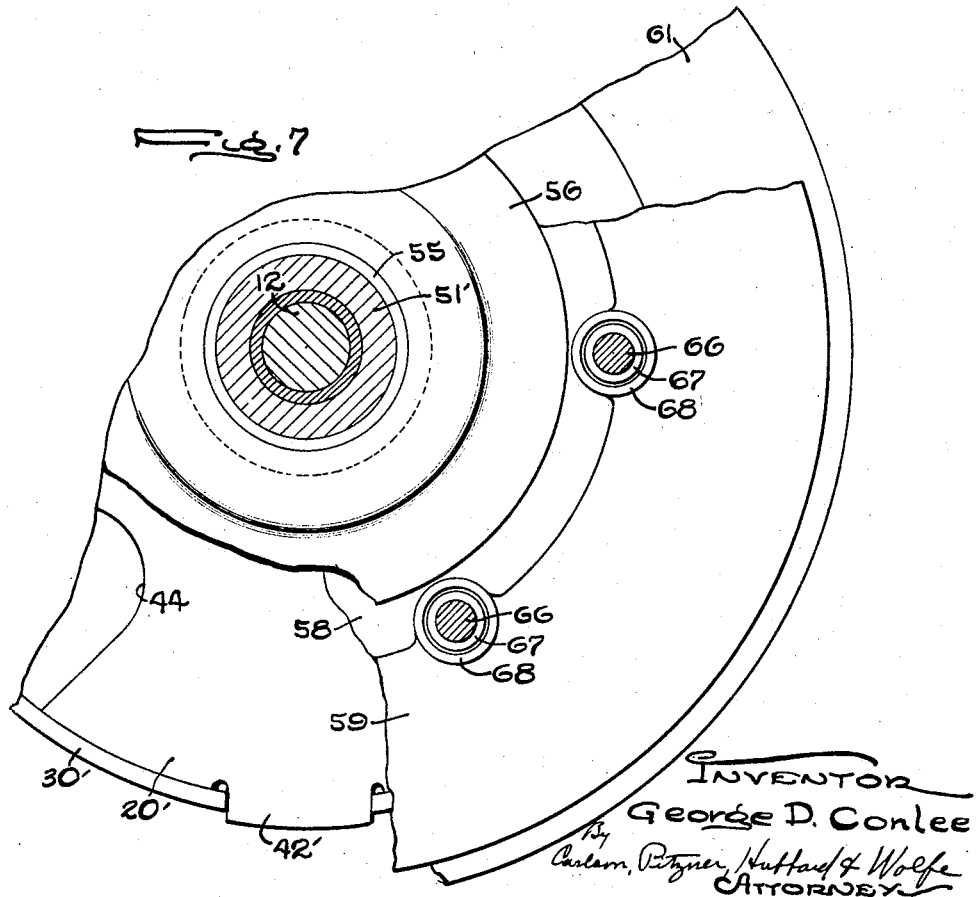
INVENTOR
George D. Conlee

United States Patent Office 2,910,161
Patented Oct. 27, 1959

2,910,161

DRIVE MECHANISM FOR WASHING MACHINES

George D. Conlee, Ripon, Wis., assignor to McGraw-Edison Company, Ripon, Wis., a corporation of Delaware Application September 30, 1957, Serial No. 687,230

4 Claims. (Cl. 192—105)

The invention relates to drive mechanisms for washing machines and more particularly to mechanisms for driving the machine components in the manner required for washing and centrifugal drying operations.

A general object of the invention is to provide a reliable, low cost coupler and brake responsive automatically to the direction of rotation of the driving motor for transmitting power to a washing machine transmission.

Another object of the invention is to provide an improved clutch for washing machine drives of the above general character which is operative either before or incident to the establishment of a driving connection between a driving member and a driven member for releasing a static brake acting to hold the driven member against rotation.

Another object is to provide a clutch particularly suitable for use in spinner type washing machines which eliminates the need for a solenoid operated static brake for holding the tub stationary during the washing portion of a cycle.

Another object is to provide a centrifugally operated directional clutch having a relatively large friction driving area for its size and in which the friction members are in the form of simple, flat rings.

A further object is to provide a centrifugally operated friction clutch which is automatically engaged or disengaged in accordance with the direction of rotation of the driving member and which maintains its set condition regardless of changes in the rotative speed of the member.

It is also an object of the invention to provide a friction clutch and brake which is rugged and durable and capable of operating efficiently and dependably for long periods without care or attention.

Other objects and advantages of the invention will become apparent from the following detailed description of the preferred embodiments illustrated in the accompanying drawings in which Figure 1 is a transverse sectional view through a preferred form of a coupler and brake mechanism embodying the features of the invention, the mechanism being shown in association with a washing machine transmission.

Fig. 2 is a plan view of the driving member of the clutch shown in Fig. 1.

Fig. 3 is a fragmentary sectional view taken in intersecting planes substantially on the line 3—3 of Fig. 2.

Fig. 4 is a perspective view of the driving plate of the clutch.

Fig. 5 is a sectional view taken in a horizontal plane substantially on the line 5—5 of Fig. 1.

Fig. 6 is a view similar to Fig. 3 showing a modified form of the clutch.

Fig. 7 is a fragmentary sectional view taken in offset planes substantially on the line 7—7 of Fig. 6.

Figure 1:
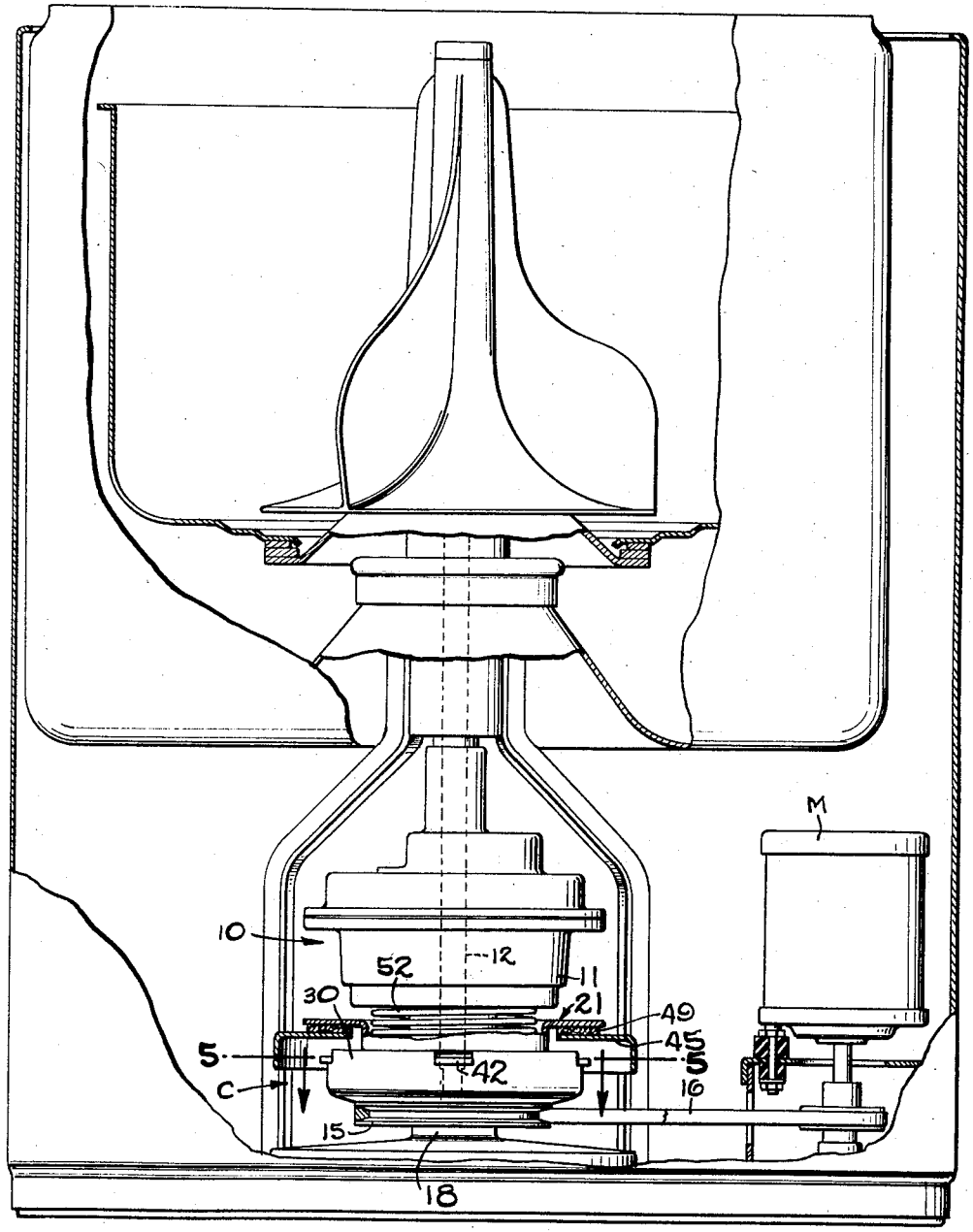

While the invention has been shown and will be described in detail with reference to a particular embodiment and one modification thereof, there is no intention that it be limited to such detail, but on the contrary, the intention is to cover all alternative constructions, modifications and adaptations falling within the spirit and scope of the invention as defined in the appended claims.

By way of illustration, a coupler and brake mechanism embodying the invention has been shown as operating in association with a transmission 10 for oscillating the agitator and spinning the clothes receptacle of an upright washing machine. While the improved mechanism can be used with various types transmissions the particular transmission shown is similar to that disclosed and claimed in my copending application, Serial No. 669,787 filed July 3, 1957. Briefly, it includes a housing 11 enclosing gearing for imparting oscillatory movements to the washing machine agitator upon rotation of an input shaft 12 herein shown as projecting from the lower end of the housing.

In machines of this general character, the transmission housing 11 is coupled to the clothes receptacle and, during the washing phases of a cycle, the transmission housing and receptacle are held stationary while the agitator oscillates. At the end of a washing or rinsing phase, water is extracted from the load in the receptacle by rotating it at high speed, the transmission housing in this instance rotating and acting to drive the receptacle. It will be understood that suitable framework is provided for supporting the transmission and other elements of the machine.

The improved coupler and brake mechanism is adapted to transmit power from a driving motor to the transmission to drive the washing machine components in proper sequence. To this end, it includes a directionally responsive centrifugally operated friction clutch indicated generally at C. As shown in Fig. 1, the clutch comprises a driving member 15 rotatably driven as by a V-belt 16 from a reversible electric motor M. The arrangement is such that the operation of the motor in one direction is effective to rotate the input shaft 12 while the transmission housing 11 is held stationary, thus imparting oscillating movements to the washing machine agitator in known manner. Upon operation of the motor in the reverse direction, both the shaft and the housing 11 are rotated and the clothes receptacle of the washing machine is rotated with them at a speed effective to centrifugally extract the water from the load of clothes in the receptacle.

In the illustrative embodiment, the driven clutch member 15 is keyed or otherwise nonrotatably secured to the projecting lower end of the transmission input shaft 12. The clutch member is rotatably supported as by an antifriction bearing 17 on a stationary part 18 of the machine frame. Supported on and rotatable with the driving member is a driving clutch plate 20 mounted for movement axially of the member 15 between engaged and disengaged positions. Upon movement to the engaged position, the clutch plate 20 coacts with and frictionally drives a driven clutch plate 21 which is nonrotatably secured to the machine part to be driven, in this instance, the housing 11 of the transmission 10. The housing is accordingly rotated at the same speed and in the same direction as the driven clutch member 15.

The shifting of the clutch plate 20 is effected in accordance with the direction of rotation of the driven clutch member 15 by means responsive to the rotative speed of the member. More specifically, the clutch plate is shifted to engaged position as an incident to the rotation of the given member in one direction. Upon rotation of the driven member in the opposite direction the clutch plate remains in or returns to disengaged position so that no rotation is imparted to the driven clutch plate 21. Shifting of the clutch plate 20 is effected in this instance by ball elements 22.

In accordance with one aspect of the invention the driven clutch plate 21 is constructed and arranged to function additionally as an element of a static brake operative to hold the transmission 11 against rotation when the clutch is disengaged. Engagement of the clutch automatically releases the brake to allow the transmission housing to turn freely.

Referring more in detail to the clutch construction shown in Figs. 1–3 of the drawings, the driven clutch member 15 is in the form of a generally bowl shaped casting having a raised central portion 25. An integral hub 26 which extends above the face of the raised portion 25 is apertured as at 27 to receive the transmission input shaft 12. It will be observed on reference to Fig. 2 that the sides of the aperture 27 are flattened to provide a nonrotatable or driving connection with the shaft. The lower portion of the hub is finished externally as at 28 to fit within the race ring of the bearing 17.

The outer or marginal portion of the casting constituting the driven clutch member is shaped to define an annular channel open at the top and having an outer peripheral wall 30 extending substantially above the top surface of the central portion 25. An integral extension 31 at the underside of the marginal portion is machined or otherwise formed to present a groove 32 concentric with the aperture 27 for the reception of the driving V-belt 16.

Integral partitions 33 extending between the central portion 25 and the wall 30 of the casting cooperate with partitions 34 extending inwardly from the wall to divide the recess into a series of pockets 35. While the exemplary clutch is shown with four such pockets, it will be understood that more or less than that number may be provided. The pockets are alike in shape and dimensions and, in the present instance, are symmetrically arranged around the rotational axis of the driving member 15. Each of the pockets has an arcuate portion 36 formed on a radius centered at the axis of the clutch member. The arcuate portions of the pockets are symmetrical, each having straight side walls terminating in a bottom wall 37 of semi-circular cross section dimensioned to receive the balls 22 with sufficient clearance to allow the balls to roll freely. The depth of each arcuate portion is slightly greater than the diameter of the ball so that the latter, when in the pocket, is entirely below the plane of the central portion 25 of the clutch member.

At the ends of the arcuate portion of each pocket, the partitions 33 and 34 are shaped to define radially outwardly directed pocket extensions 38 having their bottom walls 39 sloping upwardly from the bottom of the arcuate portion toward the periphery of the driving member. The extensions are of a width sufficient to accommodate the balls 22. Assuming that the balls are in the arcuate portions of the slot, inertia will cause them to roll toward the trailing ends of the pockets as the driving member 15 starts to rotate. It will be understood, of course, that either end of a pocket may be leading, depending upon rotation of the driving member. As the rotative speed of the driving member increases, centrifugal force acting on the balls will carry them outwardly in the extensions. As the balls roll upwardly along the sloping walls 39, they eventually project above a plane coincident with the top surface of the central portion 25 of the member as shown in Fig. 3.

The upward movements of the balls 22 are utilized to shift the driving clutch plate 20 from disengaged to engaged position. The clutch plate, as shown in Fig. 4, comprises a rigid metal disc 40 of steel or other material having suitable friction driving characteristics. The disc has a central opening 41 adapted to fit over the hub 26 of the driving member 15 and allow the disc to rest on the upper face of the central portion 25 of the member and on the upper edges of the partitions 33 and 34 which are terminated in a common plane substantially below the upper edge of the peripheral wall 30. To provide a rotational driving connection and constrain the disc to rotate with the driving member, the disc is formed with a series, in this instance, four radially extending arms 42, adapted to ride in complementary notches 43 in the wall 30 of the driving member. Accordingly, the disc is constrained to rotate with the driving member but is movable axially of the member by the balls 22 rolling up the inclined walls of the pocket extensions.

To impart the directional characteristics to the clutch, the disc is formed with a series of clearance openings 44 spaced apart to overlie one lateral extension of each of the pockets 35. The openings shown are in the form of radially extending slots in the outer marginal edge of the disc. They are dimensioned to permit the balls 22 to move upwardly without shifting the disc when rotation of the driving member is in a direction to position the balls in the pocket extensions alined with the slots. The slots, however, assist in retaining the balls in the extensions and prevent premature reversal due to changes in the speed of rotation of the member 15. This particularly adapts the clutch for operation with two-speed motors or comparable drive means.

Upon rotation of the driving member in the opposite direction, the balls 22 are positioned at the ends of the pockets covered by the unslotted portions of the disc 40. Accordingly, as the speed of the driving member increases, the balls will travel up the inclined walls 39 of such pockets and engage and shift the clutch plate 20 toward engaged position. As the movements of the balls 22 are dependent entirely on the centrifugal force acting thereon, the clutch can be constructed to engage at any desired speed by appropriately sloping the walls 39.

It will be appreciated that the openings or slots 44 in the disc may be positioned to aline with the extension at either end of a pocket to provide for either lefthand or righthand clutch operation. It will also be appreciated that where directional operation is not required the slots may be omitted and the clutch engaged upon rotation of the driving member in either direction.

The driving clutch plate 20, upon moving to engaged position cooperates with the driven plate 21 to rotate the latter and the machine part to be driven, in this instance, the transmission housing 11. The plate 21 is constructed and arranged to serve additionally as one element of a static brake adapted to hold the transmission housing against rotation when the clutch is disengaged. To this end the plate is arranged to cooperate with an element 45 defining a stationary braking surface positioned for engagement with one face of the plate. The brake element 45 may conveniently comprise a flanged ring of steel or other suitable material having its flange welded or otherwise rigidly secured to the frame of the washing machine.

In the form shown in Fig. 1, the clutch and brake plate 21 comprises an annulus of steel or other suitable material having a flat inner marginal portion 46 carrying on its lower face an annular band 47 of friction material for cooperation with the driving clutch plate 20. The outer marginal portion 48 of the plate is offset vertically from the inner portion and carries on its lower face an annular band 49 of frictional material for cooperation with the brake surface presented by the element 45. The offset of the outer marginal portion of the plate 21 permits the stationary brake element to overlie the outer edge of the driving member 15 and thus provides a very efficient and compact structure. It also affords clearance for the balls 22 when projected through the slots in the plate 20.

The inner marginal portion of the plate 21 is welded or otherwise rigidly joined to a hub 50 adapted to fit over and provide a rotary driving connection with a depending section 51 of the housing 11 which is preferably reduced in diameter. In the particular embodiment illustrated, the hub 50 is splined to the housing section to permit relative axial movement of the clutch plate and housing and thus accommodate the braking as well as clutching function of the element.

Suitable spring means herein shown as coiled compression spring 52 interposed between the housing 11 and the plate 21 urges the latter downwardly or in a direction to force the friction band 49 against the braking surface of the ring 45. Thus, the plate 21 and transmission housing 11 to which it is coupled are normally held against rotation.

When the driving clutch plate 20 is shifted axially into engagement with the friction band 47, continued outward movement of the balls 22 acts to shift both clutch plates and thus disengage the friction band 49 from the braking surface of the ring 45. The clutch plate 21 is thus freed for rotation and is frictionally driven through engagement of the driving clutch plate 20 with the friction band 47. The spring 52 exerts sufficient pressure upon the plates to prevent excessive slippage and accordingly the driven clutch plate and transmission housing 11 are rotated at the same speed as the driving member 15 of the clutch.

The modified form of the clutch and brake mechanism shown in Figs. 6 and 7 of the drawings is constructed and arranged to provide for the release of the static brake before engaging the driving elements of the clutch. In this modified mechanism the clutch driving member 15' is a pocketed casting precisely like the member 15 previously described except that its hub 26' is formed with an integral upright tubular extension 55. The extension is dimensioned internally for a running fit with the depending section 51' of the transmission housing 11. As in the previously described form of the clutch the member 15' is rotatably supported on a stationary part of the machine frame by an antifriction bearing 17.

The modified clutch is also provided with a rotatably driven and axially shiftable clutch plate 20' which in this instance serves as an actuator for the driven clutch and brake plate 21', shifting the latter into engagement with a friction driving element 56 fixed to and rotatable with the driving member 15'. In the particular construction illustrated, the driving element 56 is in the form of a ring Z-shaped in cross section and welded or otherwise rigidly secured at its inner edge to the upper end of the extension 55. The outer edge portion of the element 56 is disposed parallel to and spaced from the plate 20 and in this instance is fitted with a band 57 of friction material positioned to cooperate with the upper face of the driven clutch and brake plate 21'.

Referring more in detail to the plate 21', it will be observed that it is of the same general shape as the plate 21, having vertically offset marginal clutch and braking sections 58 and 59. At its inner edge, the clutch section 58 terminates in a sleeve-like bearing 60 adapted to be received on the extension 55 of the driven clutch member for rotation and axial sliding movement. The brake section 59 of the plate extends over a stationary brake ring 61 suitably supported on the frame of the washing machine. An annular friction band 62 cemented or otherwise attached to the lower face of the section 59 cooperates with the upper face of the brake ring to hold the transmission housing against rotation.

To perform its driving and braking functions the plate 21' is coupled to the housing 11 so as to rotate with it as a unit but is permitted limited movement axially of the casing. Starting and stopping shocks are absorbed and smooth, even acceleration and deceleration is insured by coupling the plate to the housing through a series of coiled compression springs 65 interposed between the end of the housing 11 and the upper face of the plate 21 and suitably anchored to each of those elements. As herein shown, the springs are telescoped over pilot pins 66 depending from the housing, the pins having a diameter such as to prevent lateral buckling of the springs and being of a length such as to afford clearance for the axial movements of the plate 21'. At their lower ends, the springs are seated in recess 67 formed in bosses 68 integral with the plate.

As indicated heretofore, the driving clutch plate 20' in this form of the clutch functions as an actuator for the driven clutch plate 21' rather than as a friction driving element. To this end, there is interposed between the plates a thrust bearing permitting independent rotation of the plates while transmitting the axial movements of the plate 20' to the plate 21'. The thrust bearing as shown comprises a bearing ring 69 abutting the lower face of the clutch section 58 of the plate 21' and riding on a series of needle bearings 70 carried on the upper face of the plate 20'.

With the above arrangement, axial movements of the plate 20' from the disengaged position in which it is shown in Fig. 6 act to slide the plate 21' along the extension 55 against the force exerted by the springs 65. Preferably the brake band 62 is spaced from the brake element 61 so that the brake is disengaged before the face of the clutch section 58 engages the clutch band 57. When the latter engagement occurs, the plate 59 is rotatably driven and, through the connections afforded by the spring 65, acts to rotate the transmission housing 11.

As in the previously described clutch, the shifting of the plate 20' is effected by the balls 22 as they are forced outwardly in their pockets by centrifugal force. When the force is reduced by slowing down or stopping of the driving member 15', the action of the spring 65 forces the plates 20' and 21' back to the normal rest position in which they are shown, first disengaging the clutch and then engaging the static brake.

It will be evident from the foregoing that the invention provides a practical and efficient drive mechanism for spin-dry washing machines. The mechanism includes a centrifugally operated directional clutch of novel and advantageous construction. A single platelike element is adapted to function both as a driven clutch plate and as an element of a static brake and, through the novel arrangement provided, the action of the clutch and brake are properly timed as an incident to the rotation of the driving clutch member. The improved clutch is particularly suitable for driving the transmissions of washing machines in which clothes are centrifugally dried in the same receptacle in which they are washed and rinsed. The directional characteristics of the clutch permit control of the machine operations by simply reversing the motor, thus eliminating the need for a solenoid operated clutch or a solenoid operated brake.

The improved clutch is simple and reliable in construction and is characterized by the relatively large friction driving area provided for its size. Furthermore, the friction driving and braking elements are in the form of simple, flat rings. In general, both the clutch and the brake are rugged and durable and capable of operating efficiently and dependably for long periods of time with little care or attention.

I claim as my invention:

1. In a centrifugal clutch, in combination, a rotatably supported driving member defining an annular channel, partitions dividing said channel into a series of segmental grooves arcuate about the rotational axis of the member and each having a radially outwardly directed extension at each end, the bottom walls of said extensions sloping upwardly from the bottom of the associated groove, a clutch plate supported in overlying relation to said grooves for movement axially of said member, said plate also overlying the extension at one end of each groove and having openings in its marginal edge in registration with the extension at the other end of each groove, means constraining said plate to rotate with said member, a ball element in each groove having a diameter smaller than the depth of the groove so as to clear said plate and adapt it to move into alinement with one extension when the member is rotated in one direction and into alinement with the other extension when the member is rotated in the opposite direction, the centrifugal force resulting from rotation of said driving member acting to move the ball elements outwardly and up the sloping bottom walls of the extensions with which they are alined, said ball elements acting to shift said clutch plate axially relative to said driving member only when operating in the extensions at said one end of each groove.

2. In a directionally responsive centrifugal clutch, in combination, a rotatably supported driving member having a series of arcuate pockets recessed in one face disposed symmetrically about its axis of rotation, a driving clutch plate overlying said pockets supported for rotation with the member and for movement axially of the member, a driven clutch plate supported in face-to-face relation to said driving clutch plate, a ball element in each of said pockets movable to one end of the pocket upon rotation of the member in one direction and to the other end of that pocket upon rotation of the member in the opposite direction, sloping walls on said member adjacent each end of each pocket for imparting an axial component of movement to the ball in the pocket upon rotation of the member at a predetermined speed, one of said sloping walls being operative when the member is rotated in one direction and the other being operative when the member is rotated in the other direction, said driving clutch plate having openings in its marginal edge portion in registration with the sloping wall at one end of each pocket affording clearance for the balls in their axial movements along such walls, and said balls being operative to engage the driving clutch plate in their axial movement on the sloping walls in the other ends of the pockets whereby the driving clutch plate is shifted into frictional driving engagement with the driven clutch plate.

3. In a directionally responsive centrifugal clutch, in combination, a rotatably supported driving member having a series of arcuate grooves recessed in one face and disposed symmetrically about the rotational axis of the member, each of said grooves having an extension at each end extending radially of the member and sloping upwardly toward the periphery of the member, a clutch plate supported in face-to-face relation with said member dimensioned to extend over said grooves and their extensions, said plate having openings in its marginal edge portion in registration with the extension at one end of each groove, a ball element in each groove movable to said one end of the groove and up the sloping wall of the extension at that end of the groove through the registering opening in said plate when the member is rotated in one direction, said ball being movable to the other end of the groove and up the sloping wall of the extension at such other end of the groove to engage said plate when the member is rotated in the other direction, whereby said plate is shifted axially relative to the driving member.

4. In a directionally responsive centrifugal clutch, in combination, a rotatably supported driving member having a series of arcuate pockets recessed in one face and disposed symmetrically about the rotational axis of the member, a ball element in each pocket dimensioned to roll freely in the pocket and movable to one end thereof when the member is rotated in one direction and to the other end of the pocket when the member is rotated in the other direction, said pockets being formed to impart an axial component of movement to the balls as they move toward the ends of the pockets, a clutch plate supported in face-to-face relation to said member and for movement axially relative to the member, said plate having portions overlying one end of each pocket engageable by the balls upon their movements to that end whereby the plate is shifted axially, and said plate having openings in registration with the other end of each pocket affording clearance so that the balls may move axially therein without displacing said plate.

References Cited in the file of this patent
UNITED STATES PATENTS

| | | |
|---|---|---|
| 2,346,158 | Dyer | Apr. 11, 1944 |
| 2,462,657 | McNairy | Feb. 2, 1949 |
| 2,720,955 | Young | Oct. 18, 1955 |

FOREIGN PATENTS

| | | |
|---|---|---|
| 436,016 | Great Britain | Oct. 3, 1935 |